US010203746B2

(12) United States Patent
Kumar

(10) Patent No.: US 10,203,746 B2
(45) Date of Patent: Feb. 12, 2019

(54) THERMAL MITIGATION USING SELECTIVE TASK MODULATION

(71) Applicant: Apple Inc., Cupertino, CA (US)

(72) Inventor: Derek R. Kumar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/503,318

(22) Filed: Sep. 30, 2014

(65) Prior Publication Data
US 2015/0346809 A1    Dec. 3, 2015

Related U.S. Application Data

(60) Provisional application No. 62/006,004, filed on May 30, 2014.

(51) Int. Cl.
G06F 1/32    (2006.01)
G06F 9/48    (2006.01)
G06F 1/20    (2006.01)

(52) U.S. Cl.
CPC ............ *G06F 1/3293* (2013.01); *G06F 1/206* (2013.01); *G06F 1/3243* (2013.01);
(Continued)

(58) Field of Classification Search
CPC .... G06F 1/3293; G06F 1/3243; G06F 9/4893; G06F 1/206
(Continued)

(56) References Cited

U.S. PATENT DOCUMENTS 5,623,647 A    4/1997  Maitra
7,454,631 B1   11/2008  Laudon et al.
(Continued)

FOREIGN PATENT DOCUMENTS

EP          2 560 073 A1    2/2013
TW          200403781 A     3/2004
WO     WO 2009/027153 A1   3/2009

OTHER PUBLICATIONS

PCT invitation to Pay Additional Fees for PCT/US2015/030002 dated Sep. 3, 2015.
(Continued)

*Primary Examiner* — Farley Abad
*Assistant Examiner* — Getente A Yimer
(74) *Attorney, Agent, or Firm* — Womble Bond Dickinson (US) LLP

(57) ABSTRACT

A method and apparatus of a device that manages a thermal profile of a device by selectively throttling central processing unit operations of the device is described. The device monitors the thermal profile of the device, where the device executes a plurality of tasks that utilizes a central processing unit of the device. In addition, the plurality of tasks includes a high QoS task and a low QoS process. If the thermal profile of the device exceeds a thermal threshold, the device increases a first CPU throttling for the low QoS task and maintains a second CPU throttling for the high QoS task. The device further executes the low QoS task using the first CPU utilization with the first processing core of the CPU by selectively forcing an idle of the low QoS task during an execution window. In addition, the device executes the high QoS task using the second CPU throttling with a second processing core of the CPU.

18 Claims, 19 Drawing Sheets

(52) U.S. Cl.
CPC .......... *G06F 9/4893* (2013.01); *Y02D 10/152* (2018.01); *Y02D 10/16* (2018.01)

(58) Field of Classification Search
USPC ............................................................ 710/1
See application file for complete search history.

(56) References Cited

U.S. PATENT DOCUMENTS

| | | | |
|---|---|---|---|
| 7,562,234 B2 | 7/2009 | Conroy et al. | |
| 7,949,889 B2 | 5/2011 | Sotomayor, Jr. et al. | |
| 7,992,017 B2 | 8/2011 | Safford et al. | |
| 8,621,178 B1* | 12/2013 | Lazar .................. | G06F 12/0223 711/117 |
| 2004/0051905 A1 | 3/2004 | Yamada et al. | |
| 2004/0128100 A1 | 7/2004 | Rotem | |
| 2005/0278520 A1 | 12/2005 | Hirai et al. | |
| 2005/0289362 A1* | 12/2005 | Merkin ................ | G06F 1/3203 713/300 |
| 2006/0095913 A1 | 5/2006 | Bodas et al. | |
| 2007/0124100 A1 | 5/2007 | Aguilar | |
| 2007/0240163 A1 | 10/2007 | Conrad et al. | |
| 2008/0250415 A1 | 10/2008 | Illikkal et al. | |
| 2009/0064164 A1 | 3/2009 | Bose | |
| 2009/0276505 A1* | 11/2009 | Imai .................... | H04L 41/5054 709/219 |
| 2010/0318637 A1* | 12/2010 | Ly ........................ | G06F 9/5083 709/221 |
| 2011/0023039 A1 | 1/2011 | Memik et al. | |
| 2012/0023355 A1 | 1/2012 | Song et al. | |
| 2012/0192195 A1 | 7/2012 | El-Moursy | |
| 2012/0271481 A1* | 10/2012 | Anderson ............. | G06F 1/206 700/299 |
| 2012/0331207 A1* | 12/2012 | Lassa .................... | G06F 3/0625 711/103 |
| 2013/0132972 A1 | 5/2013 | Sur et al. | |
| 2013/0155081 A1* | 6/2013 | Khodorkovsky ..... | G06F 1/3206 345/522 |
| 2013/0185433 A1* | 7/2013 | Zhu ....................... | H04L 67/303 709/226 |
| 2013/0305067 A1 | 11/2013 | Lefurgy | |
| 2014/0100838 A1 | 4/2014 | Stelmakh | |
| 2014/0195609 A1* | 7/2014 | Wise .................... | H04L 65/403 709/204 |
| 2015/0169036 A1 | 6/2015 | Sodhi | |
| 2015/0346809 A1 | 12/2015 | Kumar | |
| 2015/0347330 A1 | 12/2015 | Vaishampayan | |
| 2015/0348226 A1 | 12/2015 | Vaishampayan | |

OTHER PUBLICATIONS

Search Report, ROC (Taiwan) Patent Application No. 104116710, 1 page, dated Dec. 23, 2015.
International Search Report and Written Opinion of the International Searching Authority for corresponding International Application No. PCT/US2015/030002, dated Dec. 21, 2015, 20 pages.
International Search Report and Written Opinion of the International Searching Authority for corresponding International Application No. PCT/US2015/030020, dated Jul. 21, 2015, 11 pages.
PCT Chapter I International Preliminary Report on Patentability (IPRP Chapter I) PCT/US2015/030020 dated Dec. 6, 2016. (9 Pages).
PCT Chapter I International Preliminary Report on Patentability (IPRP Chapter I) PCT/US2015/030002 dated Dec. 6, 2016. (9 Pages).

* cited by examiner

| QOS 1202 | CLASS 1204 | PERCENT FREQUENCY CEILING | | |
|---|---|---|---|---|
| | | NO CPU THROT 1204A | SOME CPU THROT 1204B | MORE CPU THROT 1204C |
| 0 | FG APP | 100 | 100 | 90 |
| 1 | APP NAP | 100 | 100 | 75 |
| 2 | ... | 100 | 90 | 50 |
| N | BG | 100 | 75 | 25 |

THERMAL MITIGATION USING SELECTIVE TASK MODULATION

RELATED APPLICATIONS

Applicant claims the benefit of priority of prior, provisional application Ser. No. 62/006,004 filed May 30, 2014, the entirety of which is incorporated by reference.

FIELD OF INVENTION

This invention relates generally to device thermal management and more particularly to managing device thermal management by selective throttling of the device central processing unit.

BACKGROUND OF THE INVENTION

A device can typically include one or more central processing units (CPU) that are used to process a wide variety of instructions for the device. Each of the CPUs is hardware that carries out the instructions of a program by performing the basic arithmetical, logical, and input/output operations of the device. For example, the CPU can be used to process different tasks that are running on the device.

Each of these CPU operations will cause the device to consume power that leads to heat being generated by the device. This generated heat can add to a thermal load being applied to the device. An excessive thermal load can affect the device performance and, in extreme cases, can lead to a device shutdown. Existing devices can mitigate the thermal load by reducing the CPU operations globally for all processes, regardless of whether the CPU operations are for a batch process or a process supporting a user interface operation.

SUMMARY OF THE DESCRIPTION

A method and apparatus of a device that manages a thermal profile of a device by selectively throttling central processing unit operations of the device is described. In an exemplary embodiment, the device monitors the thermal profile of the device, where the device executes a plurality of processes that utilizes a central processing unit of the device. In addition, the plurality of tasks includes a high QoS task and a low QoS task. If the thermal profile of the device exceeds a thermal threshold, the device increases a first CPU throttling for the low QoS task and maintains a second CPU throttling for the high QoS task. The device further executes the low QoS task using the first CPU utilization with the first processing core of the CPU by selectively forcing an idle of the low QoS task during an execution window. In addition, the device executes the high QoS task using the second CPU throttling with a second processing core of the CPU.

In another embodiment, the device manages a thermal profile of the device by overlapping the forced idle times of low QoS tasks. In this embodiment, the device monitors the thermal level of the thermal profile of the device, where the device is executing a plurality of tasks that utilize a plurality of processing cores of the device. In addition, the plurality of tasks include multiple low QoS tasks. The device schedules the plurality of tasks on the plurality of processing cores for an execution window, where each of the multiple low QoS tasks are selectively forced idled during the execution window and the forced idled times of the multiple low QoS tasks overlap. The device further executes the plurality of tasks.

In a further embodiment, the device manages a thermal profile of the device by adjusting a throttling a central processing unit execution of a historically high energy consuming task. In this embodiment, the device monitors thermal level of the thermal profile of the device, where the device is executing a plurality of tasks that utilize a plurality of processing cores of the device. If the thermal level of the device exceeds a thermal threshold, the device identifies one of the plurality of tasks as a historically high energy consuming task, and throttles this historically high energy consuming task by setting a force idle execution time for the historically high energy consuming task. The device further executes the plurality of tasks.

In another embodiment, the device manages a thermal profile of the device by adjusting a processing core execution frequency based on the thermal load of the device. In this embodiment, the device monitors thermal level of the thermal profile of the device, where the device is executing a plurality of tasks that utilize a plurality of processing cores of the device. The device further schedules the plurality of tasks to be executed on the plurality of processing cores during an execution window. In addition, the device sets a processing frequency for each of the plurality of processing cores based one of the plurality of tasks scheduled to be executed on that processing core and the thermal level of the device. The device additionally executes each of the plurality of tasks using the plurality of the processing cores with the corresponding processing frequency.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
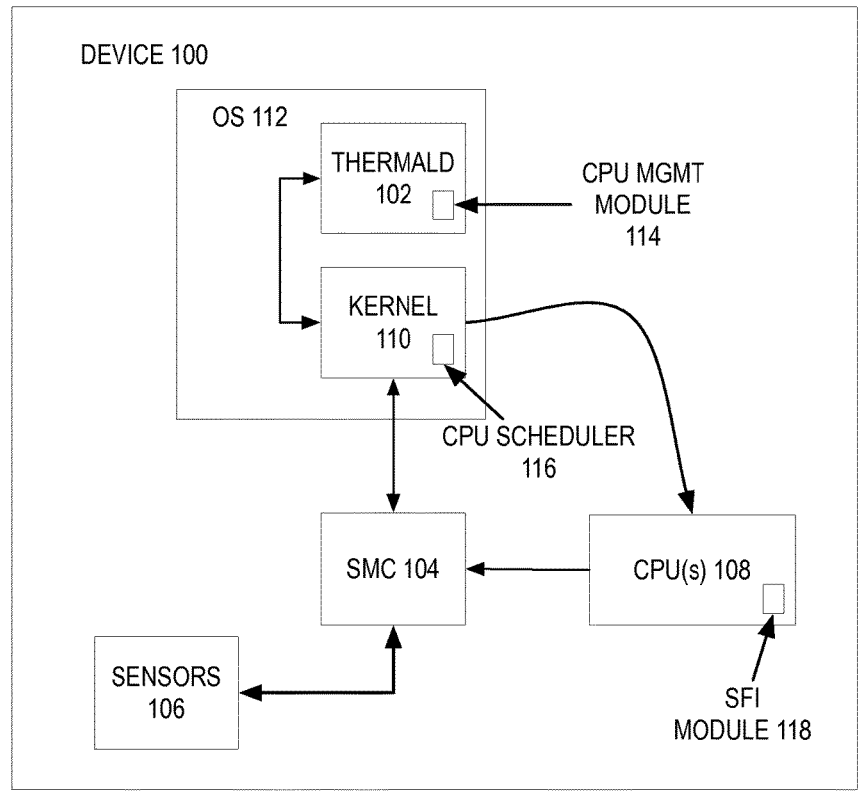
FIG. 1 is a block diagram of one embodiment of a device that mitigates a thermal profile of a device by selectively throttling central processing unit (CPU) operations of the device.

A method and apparatus of a device that manages a thermal profile of a device by selectively throttling central processing unit operations of the device is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that manages a thermal profile of a device by selectively throttling central processing unit (CPU) operations of the device is described. In one embodiment, the device selectively throttles the CPU operations by selectively force idling one, some, or all of the running tasks, so that the overall CPU utilization and thermals levels is reduced, but that the CPU operations for higher quality of service (QoS) tasks are not affected or are affected less than CPU operations for lower QoS processes. In one embodiment, the device monitors the thermal level of the device. If the thermal level reaches or exceeds one or more thermal thresholds, the device selectively throttles the CPU operations using the selective forced idling for the different tasks. Selectively force idling a task means idling the task for part or all of an execution window of the task by a processing core of the CPU that is executing the task. When a task is scheduled to be executed by a CPU processing core, this processing core executes the task for a time defined by the execution window. Without a selective forced idling, the task would be executed normally during this window, except for times in which the task idles based on a task instruction. By forcing an idle, the operating system is designating a time during the execution window in which the task is idled. This task idling preserves power and reduces the thermal load on the device. In this embodiment, each task operation has a QoS. Each QoS represents whether the task is an important process that should not be throttled (or throttled under more of a thermal load) or the task can be a less important process that can be throttled under a lesser thermal load. For example and in one embodiment, a task associated with user interface operation would have a higher QoS (e.g., graphic rendering for a UI or graphics visual, encoding/decoding for a video call, window operations, scrolling, realtime video encoding from a coupled capture device, realtime audio signal processing, video playback), whereas a task associated with a batch process (e.g., video transcoding, batch decoding/encoding, search indexing, backup, filesystem indexing, software update downloads, filesystem encryption, cloud syncing, downloading email messages), would have a lower QoS. The device can include multiple different task quality of services (QoSes). Each of the QoSes has an associated selective forced idle percentage. The device selectively throttles overall device CPU usage forcing an idle during a task's execution window for the different QoSes based on the current thermal load on the device. For example and in one embodiment, if the device thermal load increases, the device can increase the selective forced idling for the lowest or lower QoS tasks. This would decrease the CPU usage for these lower QoSes, but leave the CPU usage for the higher QoSes unchanged. As the thermal load on the device further increases, the device can either increase the selective forced idling of the lower QoS tasks and/or start to throttle the higher QoS tasks. In another embodiment, as the thermal load on the device lessens, the device can selectively relax the CPU throttling for the different QoS tasks.

In one embodiment, a task is a process that is an instance of a computer program that is being executed. In this embodiment, the task may be a user application that is executing as a result of user input. Another example of a task is a system process that provides one or more services to a user application, another system process, other process, etc. For example, in one embodiment, a system process gives a status of wireless hotspot service, lists installed applications, facilitates a search, monitors and adjusts device power settings, etc. In another embodiment, a task is a thread that is the smallest sequence of programmed instructions that can be managed independently by an operating system scheduler. In one embodiment, a thread is contained inside a process. Multiple threads can exist within the same process and share resources such as memory, while different processes do not share these resources.

As described above, and in one embodiment, selectively force idling a task during an execution window can reduce the power consumption and thermal load of device because the CPU processing core executing that task can be put in a low power state. If all of the CPU processing cores of a CPU are idled, further thermal mitigation can be realized because additional CPU supporting hardware can also be put in a low power state. In this embodiment, overlapping the selective forced idle times of executing tasks can increase the probability that all of the CPU processing cores are idle during the same time. For example and in one embodiment, for a four core CPU, consider a scenario where one core is executing a high QoS task, two core are executing low QoS tasks with selective forced idle times, and the fourth core is not executing a task. In this example, the selective forced idle times overlap, so that if the high QoS task idles, all of the processing cores would idle at the same time. By having all of the processing core of the CPU idle at the same time, the support CPU hardware (e.g., memory controller, last level cache, CPU interconnect, and other CPU support hardware) can also be put into a low power state and be power-gated, saving further power, eliminated leakage current, and further mitigating the thermal load on the device. In one embodiment, if the high QoS task were a video playback task, the task would go idle on completion of a frame.

In one embodiment, the device determines a selective forced idle setting for tasks that are historically high energy consuming tasks. In this embodiment, if the thermal load on the device reaches an energy consumption threshold, the device determines if there are any tasks running that are historically high energy consuming tasks. If there are, the device selectively idles these tasks. For example and in one embodiment, a video encoding, decoding, or transcoding task may historically consume a high enough energy that the device decides to throttle this task by selectively force idling that task.

In one embodiment, the device can mitigate the thermal load on the device by setting a CPU frequency ceiling for the different CPU processing cores based on the QoS associated with each executing task. In this embodiment, the device sets a frequency ceiling percentage for a task QoS based on the current device thermal load. In one embodiment, the frequency ceiling percentage is the maximum percentage of the CPU processing core frequency that this CPU processing core can execute for an execution window. For example and in one embodiment, if a CPU processing core has a maximum frequency of 2.3 Ghz, a frequency ceiling percentage of 50% of a task would restrict that processing core to operating at 1.15 GHz. The actual processing core frequency can be further reduced based on other power management functions of the device.

In a further embodiment, the operating system of the device assigns each thread or task a quality-of-service (QoS) class. The class can be explicitly advertised by the thread or task, or be implicitly inferred by the operating system. Inference is performed based on focality (foreground status) of the application in question, whether the application has been "app napped", energy consumption history across the CPU, GPU, and input-output (IO) devices and other criteria. Explicitly advertised classes can include background, long-running batch jobs such as filesystem indexing or encryption, backup, etc., with the gamut of QoS ranging up to user-interactive and realtime execution such as scrolling and video/audio processing. The operating system arbiters between explicitly advertised and implicitly inferred classes.

In another embodiment, the operating system, when determining processor execution frequency ceilings and the scheduling duty cycle to be applied to a given thread, uses as inputs the quality-of-service of the thread and the thermal level of the device, with the goals of providing increased performance to important tasks while simultaneously controlling temperature to acceptable limits. In the case of CPU throttling and selective duty cycling/forced idling, the primary thermal level utilized is that of the CPU, the CPU's junction temperature as measured by an on-CPU thermal diode.

FIG. 1 is a block diagram of one embodiment of a device 100 that mitigates a thermal profile of a device by selectively throttling central processing unit (CPU) operations of the device. In one embodiment, the device 100 can be a personal computer, laptop, server, mobile device (e.g., smartphone, laptop, personal digital assistant, music playing device, gaming device, etc.), network element (e.g., router, switch, gateway, etc.), and/or any device capable of executing multiple applications. In one embodiment, the device 100 can be a physical or virtual device. In FIG. 1, the device 100 includes one or more central processing units (CPUs) 108, an operating system 112, a system management controller (SMC) 104, and sensors 106. In one embodiment, the CPU 108 is a general-purpose processing device such as a microprocessor or another type of processor and is coupled to the operating system 112. More particularly, the CPU 108 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The central processing unit (CPU) 108 may also be one or more special-purpose processing devices such as an application specific integrated circuit (ASIC), a field programmable gate array (FPGA), a digital signal processor (DSP), network processor, or the like. In one embodiment, the CPU 108 can include one or more CPUs and each of the CPUs can include one or more processing cores.

In one embodiment, the operating system 112 is a set of software used to manage device hardware resources and provides common services for other running computer programs, such as application programs. In one embodiment, the system management controller 104 is a subsystem that controls the device power flow and fan speed. In this embodiment, the system management controller 104 couples to the sensors 106. In one embodiment, the sensors 106 include sensor(s) that monitor and record data regarding the thermal profile of the device 100. In this embodiment, the thermal profile is data about the thermal characteristics of the device 100. For example and in one embodiment, the thermal profile can include the device 100 temperature over time, device 100 module temperature over time (e.g., storage temperature, CPU junction temperature, bottom case temperature of the device enclosure, fan speed, and/or other data related to the thermal characteristics of the device 100). In one embodiment, the sensors 106 are one or more sensors that measure the thermal characteristics of the device 100. For example and in one embodiment, the sensors 106 can include a sensor for the device temperature, sensor for an I/O subsystem, discrete GPU, fan speed sensor, and DRAM.

In one embodiment, the operating system 112 adjusts the operation of the CPU 108 to mitigate the thermal profile of the device 100. In this embodiment, the operating system 112 includes a thermal daemon (thermald) 102 and kernel 110. In this embodiment, thermald 102 is daemon that selectively throttles the CPU operations of one or more running tasks in order to mitigate the thermal environment of the device 100. In one embodiment, thermald 102 receives the thermal level of the thermal profile and determines if the thermal level has crossed one of one or more thermal thresholds. In one embodiment, the device can be configured for several different thermal thresholds, with each thermal threshold having different CPU throttling levels. In this embodiment, crossing a thermal threshold can mean that thermald 102 adjusts a set of selective forced idle time values for different QoS tasks. In this embodiment, the selective forced idle time values are used by the CPU to schedule a CPU execution for a time slice of a task according to the QoS of that operation. Each task has an associated QoS that indicates the relative importance of how much of a CPU's execution window is to be used that task is executed by the CPU. Tasks with a higher QoS are more likely to receive more CPU execution time than a lower QoS task. In one embodiment, there can be a plurality of different QoSes (e.g., two or more different QoSes). In one embodiment, under conditions of a low thermal load of the device 100, each of the QoSes will have low selective forced idle time. As the thermal load on the device 100 increases, thermald 102 adjusts the QoS selective forced idle values of one or more of the different task QoSes. In one embodiment, a thermal load on the device can increase because the power consumption of the device or one or more components of the device (e.g., the CPU 108, graphics processing unit 102, I/O subsystem, etc.) increases.

In one embodiment, thermald 110 selectively increases the selective forced idling for the lower QoS tasks before decreasing the higher QoS tasks, so that CPU executions for lower QoS tasks are throttled before the higher QoS tasks. By selectively throttling the lower QoS task CPU executions, the CPU execution for the higher QoS tasks are not throttled, but the overall CPU usage decreases, thus decreasing the power consumption of the storage system for the device 100, and decreasing the heat generated by the device, and reducing the thermal load on the device 100. If the thermal load on the device 100 continues to increase, thermald 110 can either further throttle the lower QoS tasks and/or start to throttle the higher QoS tasks. In one embodiment, thermald 110 throttles both the lower and higher QoS tasks. In another embodiment, as the thermal load of the device decreases, thermald 110 lessens or removes the throttling of the lower and/or higher levels by relaxing the constraints placed on the different QoS tasks. In this embodiment, if the thermal load of the device lessens, thermald 110 relaxes the selective forced idling of one, some, or all tasks to a normal state (e.g., no selective forced idle for that task). The CPU throttling can occur by throttling either one, some or all of the CPU(s) 108. In one embodiment, the setting of the selective forced idle for different QoSes is performed by the CPU management module 114. Managing the CPU executions for different QoS tasks is further described in FIG. 7 below. In one embodiment, the kernel 112 that is a basic component of the operating system 112 and provides a level of abstraction for the device resources (e.g., tasks, input/output systems, network resources, etc.). In one embodiment, the kernel 110 schedules tasks for execution by the CPU(s) 108. In one embodiment, the kernel includes a CPU scheduler 116 that schedules the tasks for execution using the selective force idle values for each of the tasks. In one embodiment, the CPU(s) 108 include an SFI module 118 that executes the tasks using the selective forced idle values for each of the tasks.

Figure 2:
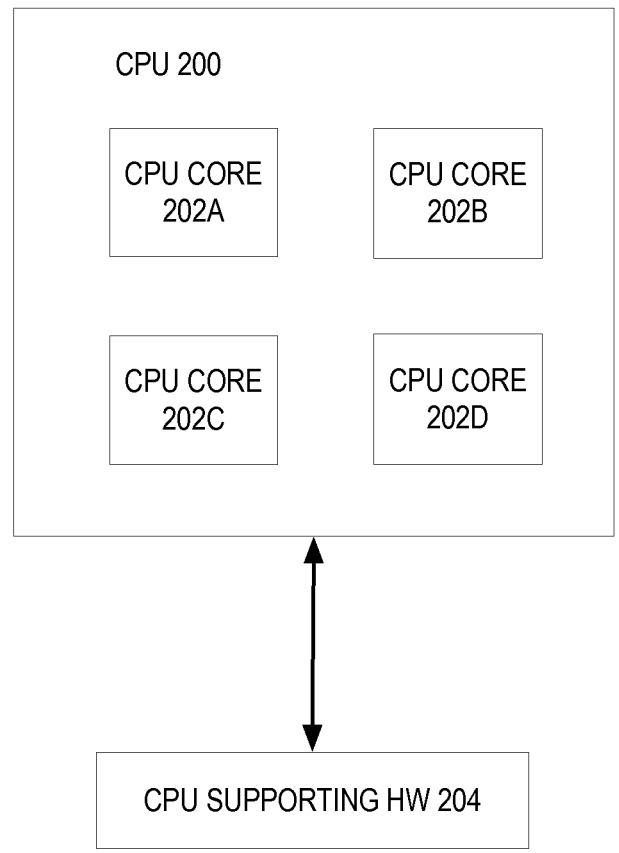
FIG. 2 is a block diagram of a CPU with multiple CPU processing cores and supporting hardware.

FIG. 2 is a block diagram of a CPU 200 with multiple CPU processing cores 202A-D and supporting hardware 204. While in one embodiment, the CPU 200 includes four different CPU processing cores 202A-D, in alternate embodiments, the CPU 200 can include more or less CPU processing cores. In one embodiment, each CPU processing core 202A-D is an independent compute unit that can read and execute program instructions at a particular execution frequency. In one embodiment, each of CPU processing cores 202A-D can either operate at the same execution frequency, if a task is scheduled to executed on that core, or can be put in a lower power state (e.g., if no task scheduled or task idle). In this embodiment, the low power state hibernates the CPU core 202A-D, which reduces the amount of power used and heat generated by the device. Thus, in one embodiment, the CPU 200 can have some of the CPU cores 202A-D running and executing tasks and other CPU cores 202A-D hibernating in a low power state. In addition, the CPU 200 includes CPU support hardware 204. In one embodiment, the CPU support hardware 204 includes a memory controller, last level cache, CPU interconnects etc. In one embodiment, if all of the CPU 202A-D are idle, the CPU supporting hardware 204 can be put in a low power state and be power-gated to eliminate leakage current, further saving power and reducing the thermal load on the device.

In one embodiment, the CPU cores 202A-D can be put into the low power state for part of an execution window when executing a task. In this embodiment, a task can be scheduled on one or more of the CPU cores 202A-D to be executed during the executed window. During this execution window, the one or more of the CPU cores 202A-D can idle that executing tasks, so as to put the CPO core 202A-D into a low power state. This partial idling of the CPU core is called a selective forced idle as described above. In one embodiment, a selective forced idle can be performed based on the thermal load of the device and the QoS of the executing task.

Figure 3:
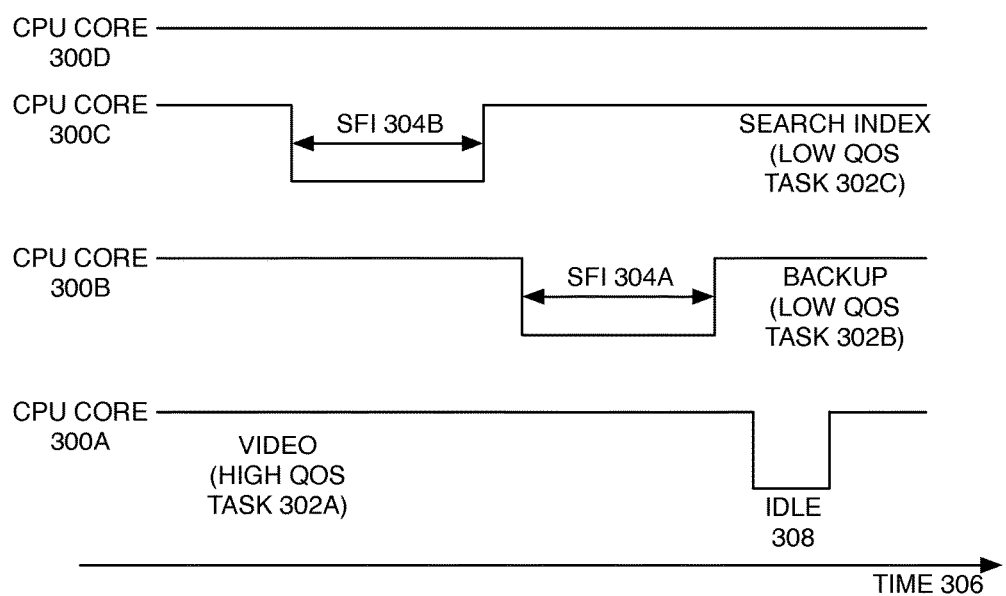
FIG. 3 is an illustration of one embodiment of CPU core execution timelines that include selective forced idle for low QoS tasks.

FIG. 3 is an illustration of one embodiment of CPU core execution timelines 300A-D that include selective forced idle for low QoS tasks. In one embodiment, CPU core 300A is executing a video task, which is a high QoS task. In this embodiment, the CPU core 300A executes the video task for the entire execution window, with exception of a normal idle 308. In one embodiment, a normal idle 308 during the course of normal execution. For example and in one embodiment, if the high QoS task were a video playback task, the task would go idle on completion of a frame. In contrast, each of CPU cores 300B-C are executing low QoS tasks. For example and in one embodiment, CPU core 300B is executing a backup task 302B, which is a low QoS task. Similarly, CPU core 300C is executing another low QoS task, a search indexing task 302C. In these embodiments, each of the low QoS tasks a selectively forced idle is scheduled to reduce the thermal load on the device. For example and in one embodiment, the backup task 302B is selectively forced idled during the time period 304A and the search indexing task is selectively forced idled during the time period 304B. In each of these forced idled time periods, the corresponding CPU cores can be put into a low power states, saving power and mitigating the thermal load on the device. In one embodiment, the CPU core 300D is not scheduled to have a task executing during this execution window and is in a low power state.

As described in FIG. 3, a low QoS task can be selectively forced idle for part (or possibly all) of an execution window in order to mitigate a thermal load on a device. Alternatively, if the thermal load is high enough, a high QoS task can be selectively forced idled as well. A selectively force idle for a task idles the CPU processing core for a period of time during an execution window of a task. By idling the processing core, less power is consumed by the device and less heat is produced. However, in FIG. 3, the selective forced idle time period do not overlap, such that all of the CPU processing cores are idling at the same time. If all of the CPU processing cores can be idled over the same time, the entire CPU can be put into a low power state, including the CPU supporting hardware. To do so, the selective forced idle times can be pashed aligned such that the selective force idle time overlap to increase the likelihood that a high QoS task (e.g., the video task 302A of FIG. 3) idles during the overlapping selective forced idle times of the other tasks.

Figure 4:
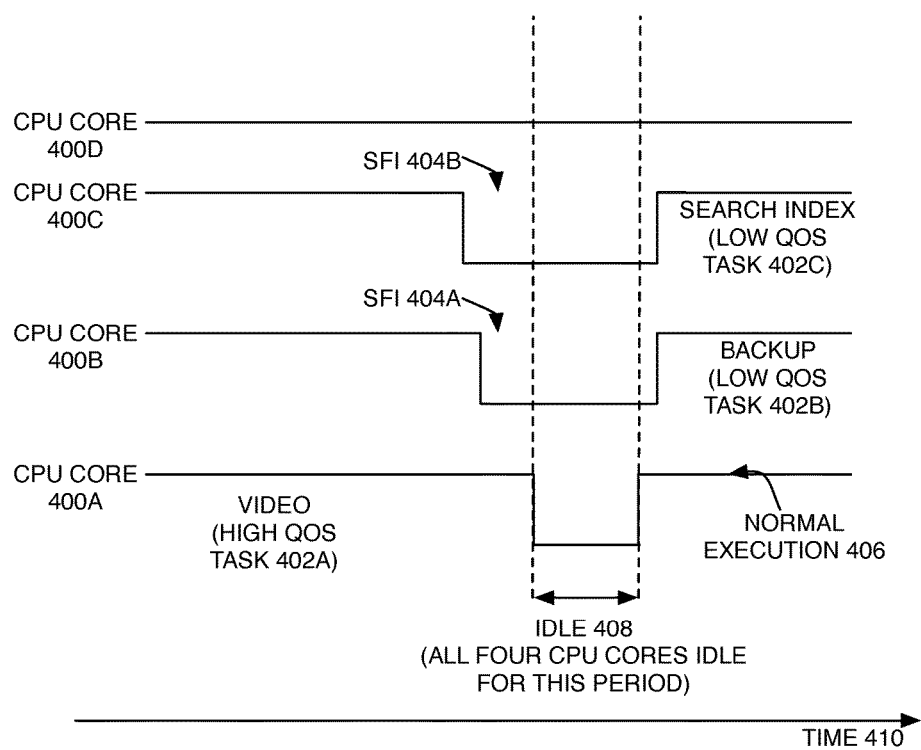
FIG. 4 is an illustration of one embodiment of CPU core execution timelines that are phase aligned with overlapping selective forced idle for low QoS tasks.

FIG. 4 is an illustration of one embodiment of CPU core execution timelines 400A-D that are phase aligned overlapping selective forced idle for low QoS tasks. In FIG. 4 and in one embodiment, CPU core 400A is executing a video task, which is a high QoS task. In this embodiment, the CPU core 400A executes the video task for the entire execution window, with exception of a normal idle 408. In addition, each of the CPU cores 400B-C are executing low QoS tasks, a backup task 402B and searching indexing task 402C, respectively. These two low QoS tasks 402B-C have overlapping selective forced idle times 404A-B, respectively. By overlapping the forced idle times, it increases the likelihood that all of the CPU cores are idle at the same time. Overlapping the selective forced idle times phase aligns the forced idling times of these tasks 402B-C. The selective forced idling times of the low QoS tasks can be the same or different. For example and in one embodiment, the backup task 402B is selectively forced idle during time period 404A, which overlaps with the selectively forced idle time 404B of the search indexing task 402C. In one embodiment, during the overlapped selective forced idle times of tasks 402B-C, the video task 402A idles during time period 408. Because all of the CPU cores 400A-D are idle during this time period 408, the CPU can be put into a low power state, including any supporting CPU hardware (e.g., CPU 200 and CPU supporting hardware 204 as describe in FIG. 2 above).

Figure 5:
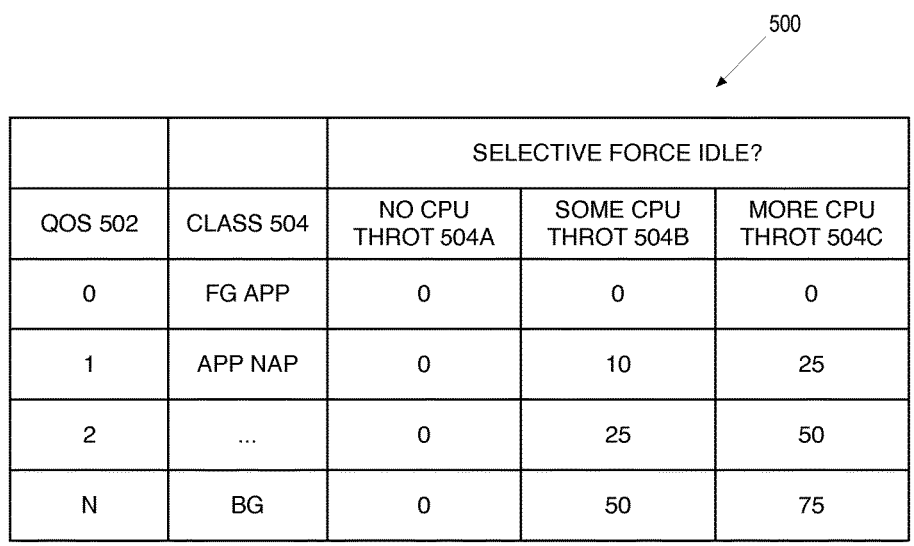
FIG. 5 is an illustration of a table of selective force idle percentages for different levels of CPU throttling.

FIG. 5 is an illustration of a table 500 of selective force idle percentages for different levels of CPU throttling. In FIG. 5, the table 500 includes a column 502 of QoS classes, column 504 that includes the process class, and columns 504A-C of different selective forced idle percentages for different CPU throttling conditions. In one embodiment, the different QoS class assignments can be based on focality (foreground status) of the application in question, whether the app has been "app napped", energy consumption history across the CPU, GPU and IO devices and other criteria. Explicitly advertised classes include background, for long-running batch jobs such as filesystem indexing or encryption, backup etc., with the gamut QoS classes ranging up to user-interactive and realtime execution such as scrolling and video/audio processing. In one embodiment, QoS 0 is the highest QoS and QoS N is the lowest QoS. In this embodiment, each of these QoS classes can correspond to different classes of tasks. For example and in one embodiment, QoS 0 can be the class of tasks related to foreground applications. QoS 1 can be tasks related to applications in the app nap state. QoS N can be tasks related to background applications.

Three different CPU throttling conditions are illustrated in FIG. 5. In one embodiment, for the no CPU throttling condition 504A, not of these QoSes is selectively forced idle. In this embodiment, this means that each of the tasks is executed normally during the execution window. This condition represents a device with little or no thermal load. In this embodiment, each of the tasks will be scheduled for CPU execution and processed normally with no selective forced idling. As the thermal load for the device increases, the device starts to throttle the lower QoS tasks. In one embodiment, this is illustrated the column 504B where there is some CPU throttling for the lower QoS tasks. For example in one embodiment, QoS 0 executes normally with no forced idling. QoS 1 has selective forced idling of 10%. This means, that for an execution window, a task with a QoS of 1, will be selectively forced idle for 10% of the execution window. In addition, QoSes 2 and N will be selectively forced idle for 25% and 50%, respectively. This illustrates the lower QoS tasks getting potentially throttled by 10-50%. As the thermal load further increases, each of the QoSes may have the CPU throttled further. For example in one embodiment, in column 504C, QoS 0 has a selective forced idle percentage of 10%, QoSes 1, 2, and N have a selective forced idle percentages of 25, 50, and 75%, respectively. At this level, the lower QoSes are more selectively restricted, although still will get some CPU execution time.

Figure 6:
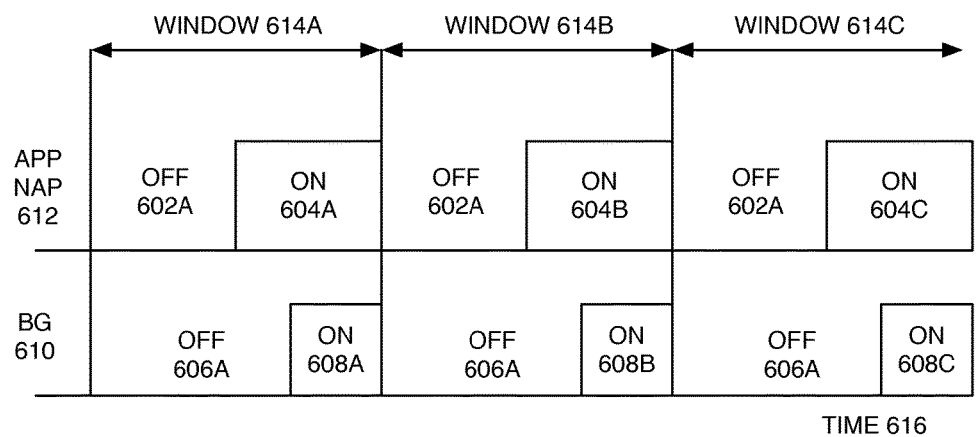
FIG. 6 is an illustration of execution windows for two different tasks with selective force idling applied to these tasks.

FIG. 6 is an illustration of execution windows 614A-C for two different tasks with selective force idling applied to these tasks. In FIG. 6, tasks for a background process 610 and an application in app nap 612 are selectively forced idled during the execution windows 614A-C. In one embodiment, during each execution window, each of the tasks is partially executed during the execution window. For example and in one embodiment, for the background task 610, the task is executed during the time periods 608A-C and idled during the time periods 606A-C. In this example, the background task 610 is idled for approximately 75% of the execution windows 614A-C and executed for 25% of the execution windows 614A-C. As anther example and embodiment, for the task in an application nap 610, the task is executed during the time periods 602A-C and idled during the time periods 604A-C. In this example, the app nap task 612 is idled for approximately 50% of the execution windows 614A-C and executed for 50% of the execution windows 614A-C.

Figure 7:
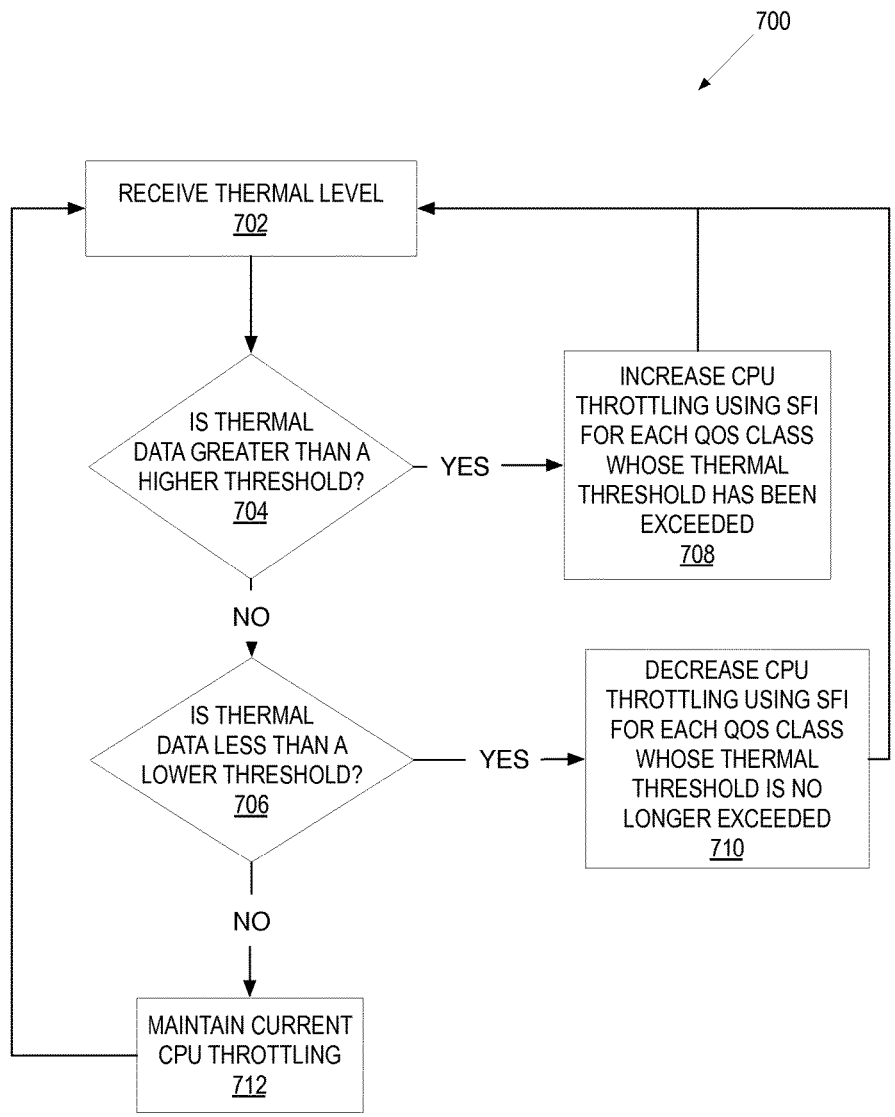
FIG. 7 is a flow diagram of one embodiment of a process to manage CPU throttling based on the thermal level of the device.

FIG. 7 is a flow diagram of one embodiment of a process 700 to manage CPU throttling based on the thermal level of the device. In one embodiment, process 700 is performed by a thermal daemon to manage CPU throttling, such as thermald 112 as described above in FIG. 1. In FIG. 7, process 700 begins by receiving the thermal level at block 702. In one embodiment, the thermal level is the data related to the thermal profile or other thermal characteristics of the device. For example in one embodiment, the thermal level can be time-dependent thermal level regarding the device temperature, temperature of a particular module of the device, data regarding fan use, and/or other data related to the thermal characteristics of the device. At block 704, process 700 determines if the thermal level is greater than a higher threshold. In one embodiment, the higher threshold is a threshold that indicates that the device can have greater CPU throttling so as to mitigate the thermal load that is on the device. For example and in one embodiment, the thermal threshold can be related to the temperature of the device, a module of the device, fan speed, or some other thermal characteristic. As another example and embodiment, a set of higher thermal threshold could be if the device temperature exceeded 40° C., 45° C., 50° C., etc. In another embodiment, the thermal threshold can be based on time of day or user activity. For example and in one embodiment, if the user was actively interacting with the device, the process 700 could choose to control thermals more aggressively. If process 700 can predict that the device is not in actively in use (say at 2 a.m.) and will have sufficient time to cool down, activities which may have been delayed during the day such as backups could be executed at a higher performance level. If the thermal level is greater than a higher threshold, process 700 adjusts the selective forced idling for different task QoSes to increase the CPU throttling at block 708 for each QoS class whose thermal threshold has been exceeded. In this embodiment, process 700 can start to throttle a QoS or further throttle an already throttled QoS. In one embodiment, process 700 throttles a QoS by increasing the selective forced idling percentages of a task with that QoS. For example in one embodiment, process 700 can throttle a QoS by increasing a selective forced idling from 0% to 25% as described in FIG. 5 above. Alternatively, process 700 can throttle an already throttled QoS from 25% up to 50%. By selectively increasing a forced idle for different QoSes, process 700 selectively throttles the different QoSes, thus allowing greater CPU execution for higher QoSes and lower CPU execution for lower QoSes. This allows for less power consumption of the CPU for the device, while having better CPU throughput for higher QoS processes at the expense of CPU throughput lower QoS processes. A lower power consumption of the storage system can help mitigate the thermal load on the device.

If the thermal level is not greater than a higher threshold, process 700 determines if the thermal level is less than a lower threshold at block 706. In one embodiment, if the thermal level is less than a lower threshold, process 700 may want to relax the CPU throttling as the thermal load on the device may be lessening. For example and in one embodiment, if the current throttling is for a device with a temperature of 40-45° C. and the temperature falls to below 40° C., which is a low thermal load for the device, process 700 may relax the current CPU throttling (e.g., by decreasing the selective forced idling percentages). If the thermal level is less than a lower threshold, at block 710, process 700 adjusts the selective forced idling percentages to decrease the CPU throttling. In one embodiment, process 700 relaxes the restrictions placed on the CPU throughput for one or more of the different QoSes. For example and in one embodiment, process 700 can relax a QoS with a 25% selective forced idle back to an unrestricted 0% selective forced idle as described in FIG. 5 above. Alternatively, process 700 can relax a restricted QoS at a 50% selective forced idle to a less restricted 25% selective forced idle. If the thermal level is not less than the lower threshold, process 700 maintains the current CPU throttling at block 712. Execution proceeds to block 712 above.

Figure 8:
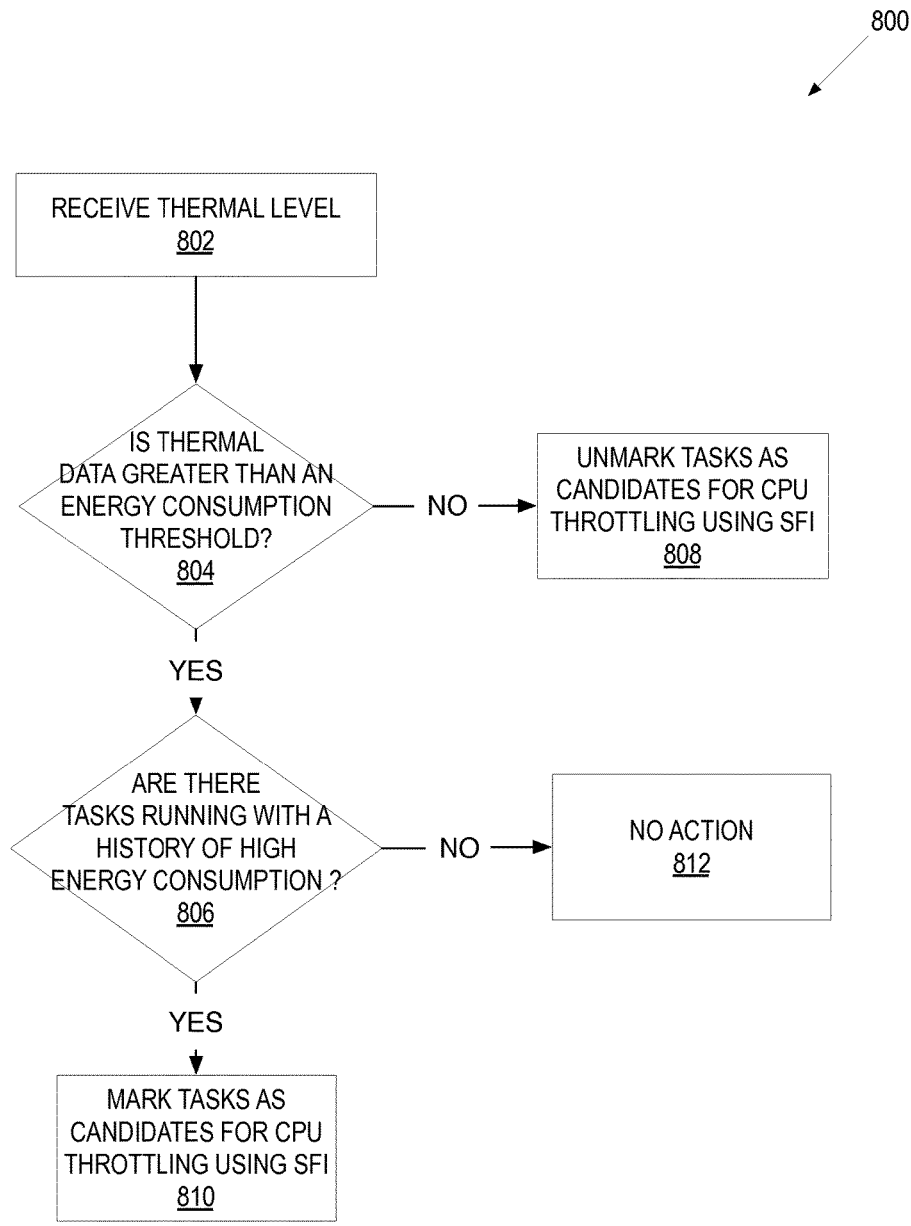
FIG. 8 is a flow diagram of one embodiment of a process to manage CPU throttling for a high energy consuming task based on the thermal level of the device.

In addition to setting a selective forced idle value based on a QoS of a task, the device (e.g., device 100) can set a selective forced idle value based on historical energy consumption by the task. For example and in one embodiment, if a device has a high thermal load, the device can throttle historically high energy consuming tasks by setting the selective forced idle value for those tasks. In this embodiment, the device may throttle the CPU for historically high energy consuming tasks instead having the thermal load affect important system or user tasks (e.g., Windows server, menu operations, virtual memory subsystem and other system components). FIG. 8 is a flow diagram of one embodiment of a process 800 to manage CPU throttling for a high energy consuming task based on the thermal level of the device. In one embodiment, process 800 is performed by a thermal daemon to manage CPU throttling for high energy consuming tasks, such as thermald 112 as described above in FIG. 1. In FIG. 8, process 800 begins by receiving the thermal level at block 802. In one embodiment, the thermal level is the data related to the thermal profile or other thermal characteristics of the device. For example in one embodiment, the thermal level can be time-dependent thermal level regarding the device temperature, temperature of a particular module of the device, data regarding fan use, and/or other data related to the thermal characteristics of the device. At block 804, process 800 determines if the thermal level is greater than a high energy consuming threshold. In one embodiment, the high energy consuming threshold is a threshold for a condition in which the device throttles historically high energy consuming tasks. By throttling historically high energy consuming tasks, the device mitigates the thermal load on the device, even if the historically high energy consuming task is a foreground application. For example and in one embodiment, the thermal threshold can be related to the temperature of the device, a module of the device, fan speed, or some other thermal characteristic. As another example and embodiment, a set of higher thermal threshold could be if the device temperature exceeded 50° C. or greater.

At block 806, process 800 determines if there are tasks running that are historically high energy consuming tasks. For example and in one embodiment, a video encoder/decoder/transcoder task may be a historically high energy consuming task. In one embodiment, process 800 retrieves information about historical energy consumption information from a database that tracks the energy consumption for previously running tasks. In one embodiment, the energy consumption data for a task is the amount of energy that the device uses while executing that task. In this embodiment, the device tracks the energy consumption of different running applications. If there is a currently running task that is a historically high energy consuming task, at block 810, process 800 marks this task as candidates for CPU throttling using selective forced idling. In one embodiment, process 800 marks a historically high energy consuming tasks for CPU throttling by setting a selective forced idling value of greater than 0%. For example and in one embodiment, process 800 would set a selective forced idling value of 50% for a video encoding/decoding/transcoding task that is a historically high energy consuming task. In this embodiment, the CPU scheduler would use this setting to selectively force idle that task. If there are no tasks running with a history of high energy consumption, process 800 takes no action at block 812.

If, at block 804, the thermal level is not greater than an energy consumption threshold, process 800 unmarks any task that has been marked previously for selective forced idling based on historical energy consumption at block 808. For example and in one embodiment, if the device's thermal level has fallen below the energy consumption threshold and a video transcoding task has been selectively forced idle due because this task is a historically high energy consumer, the device unmarks that task and removes the forced idling of that task. While in one embodiment, there is one energy threshold, in alternate embodiments there can be multiple energy thresholds with varying degrees of selective forced idle values.

Figure 9:
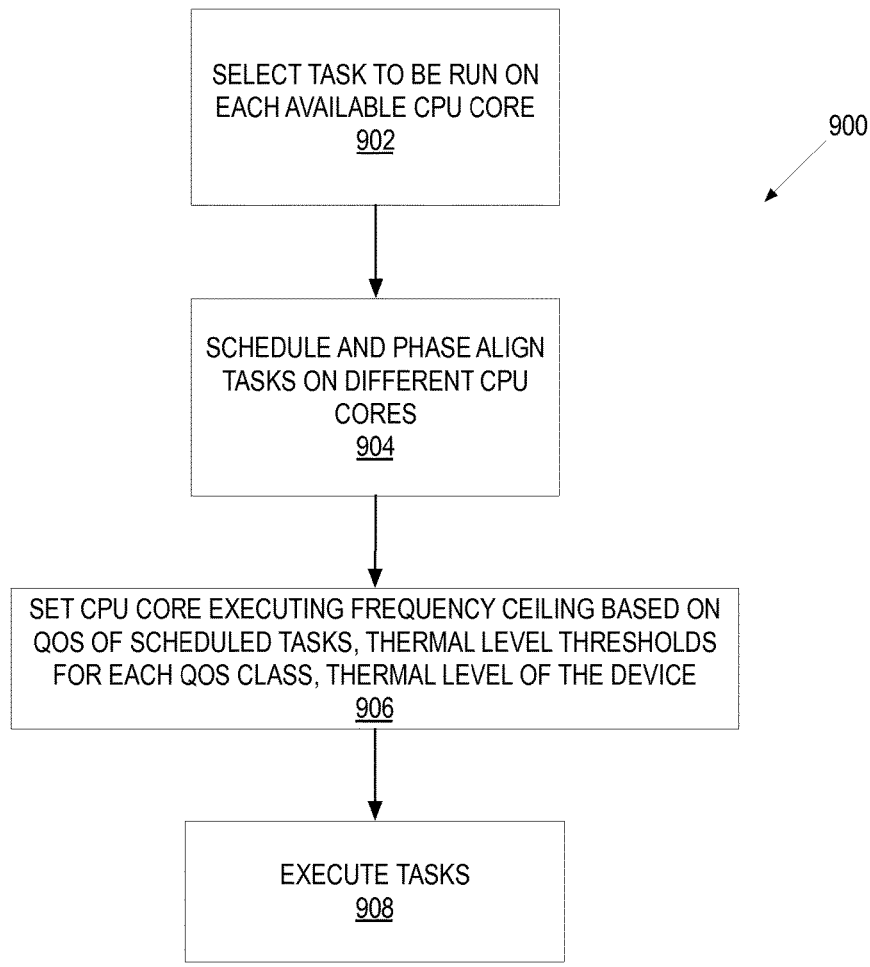
FIG. 9 is a flow diagram of one embodiment of a process to schedule and execute tasks using CPU throttling.

As described above, the device can selectively restrict and relax different selective forced idle values in response to the thermal level of the device. The device uses the different selective forced idle values to process the device CPU operations. FIG. 9 is a flow diagram of one embodiment of a process 900 to schedule and execute tasks using CPU throttling. In one embodiment, a CPU scheduler performs process 900 to schedule and execute the tasks using CPU throttling, such as CPU scheduler 116 as described above in FIG. 1. In FIG. 9, process 900 begins by selecting a task to be run on each available CPU core. In one embodiment, process 900 selects the tasks by selecting the available tasks with the highest QoS. For example and in one embodiment, if there are three tasks available, a high QoS video task, a low QoS backup task, and a low QoS search indexing task for four processing cores, process 900 would select these three tasks on the three of the four processing cores. At block 904, process 900 schedules and phase aligns the selected tasks on the different CPU cores. In one embodiment, each of the selected tasks may have selective forced idle times. In this embodiment, process 900 would schedule the selective forced idle times for each applicable tasks such that the forced idle times would overlap. In one embodiment, the forced idle times of the tasks are maximally overlapped, such that forced idle times overlap as much as possible. In this embodiment, by maximally overlapping the forced idle times, it increases the probability that all of the processing cores will be idle for part of the execution window. In one embodiment, the phase aligning of the tasks is further described in FIG. 10 below.

Processes 900 sets the CPU core executing frequency ceiling based on the QoS of scheduled tasks, thermal level thresholds for the QoS class and thermal level of device at block 906. In one embodiment, each of the CPU core executes at a CPU frequency. The CPU core frequency ceiling can be the same for all of the processing cores of a CPU or can be different. Setting the CPU core frequency ceiling is further described in FIG. 13 below. At block 908, process 900 executes the tasks. In one embodiment, process 900 executes the tasks by having the CPU processing core execute the task during the non-idling time of the execution window for that task. For example and in one embodiment, process 900 executes each task during the "on" portion of the execution window as described in FIG. 6 above.

Figure 10:
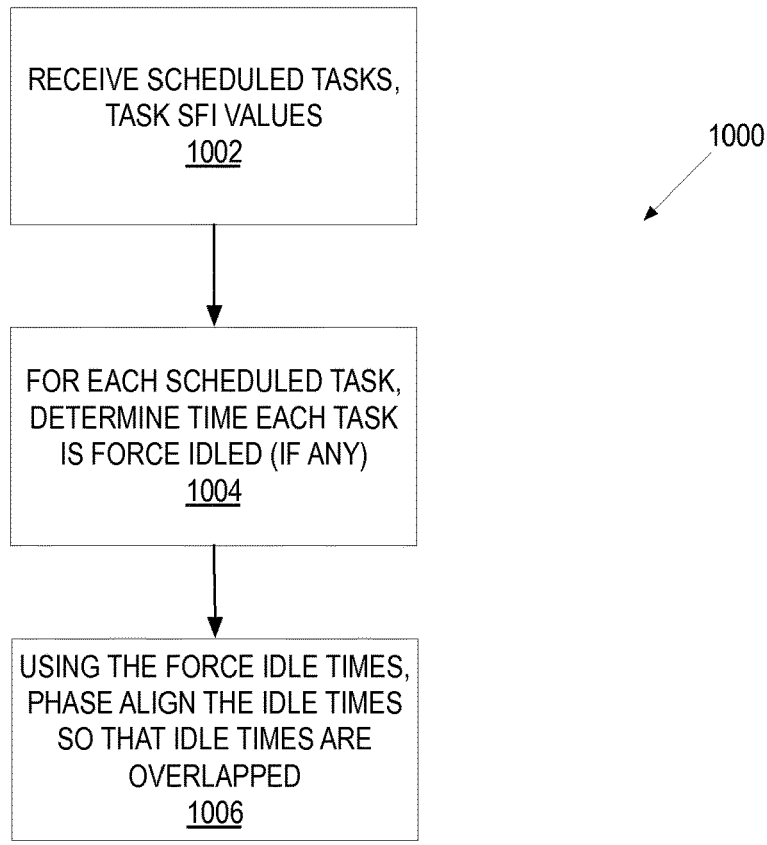
FIG. 10 is a flow diagram of one embodiment of a process to phase align tasks that are selective forced idle on different CPU cores.

As described above, if the idling times of the selective forced idle tasks overlap, the probability that all of the CPU processing cores of the CPU will idle at the same time increases. In one embodiment, this can be accomplished by phase aligning the forced idles times of the selective forced idle tasks. FIG. 10 is a flow diagram of one embodiment of a process 1000 to phase align tasks that are selective forced idle on different CPU cores. In one embodiment, phase aligning is performed by a CPU scheduler such as the CPU scheduler 116 as described in FIG. 1 above. In FIG. 10, process 1000 begins by receiving the scheduled tasks in the tasks selective forced idle values for those selected tasks at block 1002. In one embodiment, the selective forced idle time values either are derived from task QoS value or the value is assigned (e.g., historically high energy consumers as described in FIG. 8 above). At block 1004, and for each scheduled task, process 1000 determines the amount of time each task is forced idled (if any). In one embodiment, if a task is to be selectively forced title, this means that a portion of the execution window for that task will be idle. In this embodiment, process 1000 determines the time period of the execution window for that task where the task is force idled. For example in one embodiment, if the task is to be selectively force idled for 50% of the execution window, process 1000 determines that half of the execution window for that task will be idle. Using the forced idle times of the scheduled tasks, process 1000 phase aligns the idle times so that the idle times of these tasks overlap. In one embodiment, process 1000 phase aligns the forced idle times, such that each of the forced idle times overlap and a smaller forced idle time completely overlaps with a greater forced idle time. In this embodiment, the forced idle times maximally overlap and give the greatest probability that all of the CPU processing cores in a CPU will idle at the same time. By idling all the CPU processing cores at the same time, each of the CPU processing cores can be put in a low-power state, and the supporting hardware of the CPU can be put in a low-power state as well.

Figure 11:
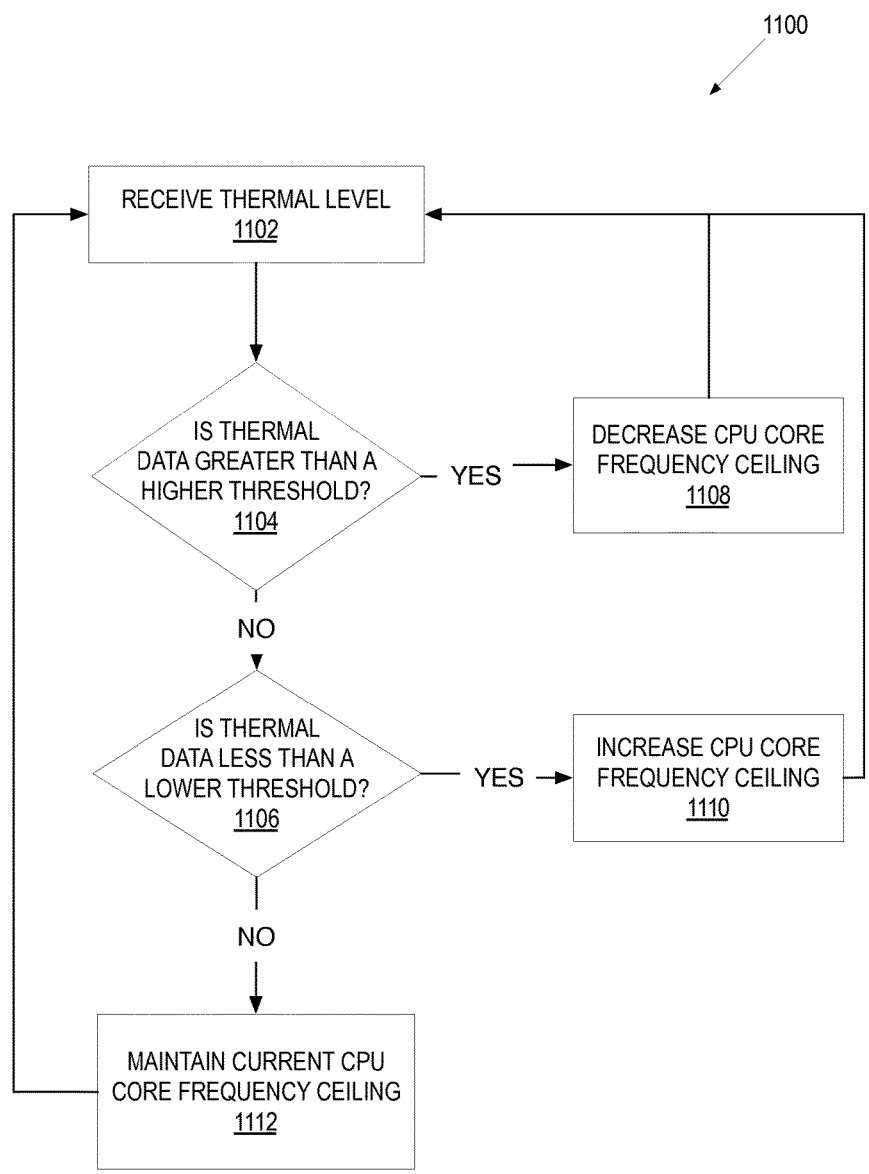
FIG. 11 is a flow diagram of one embodiment of a process to manage CPU frequency ceilings based on the thermal level of the device.

FIG. 11 is a flow diagram of one embodiment of a process 1100 to manage CPU frequency ceilings based on the thermal level of the device. In one embodiment, portable multicore systems provide a single CPU frequency plane across all cores of that system. In other words, cores executing in parallel execute at the same frequency. On such systems, the selective task modulation mechanism improves energy efficiency in scenarios where tasks with heterogeneous QoSes are active in parallel. On systems without this invention, the lower quality-of-service tasks must perforce execute at the high frequency appropriate to the performance demands of the high quality-of-service task. In one embodiment, by de-scheduling the lower QoS tasks in phase, the system has an opportunity to execute the lower QoS tasks during a period where the high QoS is not active, thus selecting a lower, more energy efficient processor frequency for the low QoS tasks. This can also potentially improve the performance of the higher quality-of-service tasks by devoting more shared processing resources, including shared processor caches, to the higher QoS task. In one embodiment, process 1100 is performed by a thermal daemon to manage CPU throttling, such as thermald 112 as described above in FIG. 1. In FIG. 11, process 1100 begins by receiving the thermal level at block 1102. In one embodiment, the thermal level is the data related to the thermal profile or other thermal characteristics of the device. For example in one embodiment, the thermal level can be time-dependent thermal level regarding the device temperature, temperature of a particular module of the device, data regarding fan use, and/or other data related to the thermal characteristics of the device. At block 1104, process 1100 determines if the thermal level is greater than a higher threshold. In one embodiment, the higher threshold is a threshold that indicates that the device can have greater CPU throttling by reducing a CPU core frequency so as to mitigate the thermal load that is on the device. For example and in one embodiment, the thermal threshold can be related to the temperature of the device, a module of the device, fan speed, or some other thermal characteristic. As another example and embodiment, a set of higher thermal threshold could be if the device temperature exceeded 40° C., 45° C., 50° C., etc. In another embodiment, the thermal threshold can be based on time of day or user activity. If the thermal level is greater than a higher threshold, process 1100 adjusts the selective forced idling for different task QoSes to increase the CPU throttling by reducing a CPU core frequency ceiling at block 1108. In this embodiment, reducing the CPU core frequency ceiling will cause the CPU processing core to execute as a lower frequency, thus reducing the power used by the CPU processing core as well as reducing the thermal load on the device. In this embodiment, process 1100 can start to throttle an unrestricted QoS or further throttle an already throttled QoS. In one embodiment, process 1100 throttles a QoS by decreasing the CPU processing frequency ceiling of that QoS. For example in one embodiment, process 1100 can throttle a QoS by decreasing a CPU processing frequency ceiling from 100% to 90% as described in FIG. 12 below. Alternatively, process 1100 can throttle an already throttled QoS from a 50% down to a 25% CPU processing frequency ceiling. By selectively decreasing a CPU processing frequency ceiling for different QoSes, process 1100 selectively throttles the different QoS, thus allowing greater CPU execution for higher QoSes and lower CPU execution for lower QoSes. This allows for less power consumption of the CPU for the device, while having better CPU throughput for higher QoS processes at the expense of CPU throughput lower QoS processes. A lower power consumption of the storage system can help mitigate the thermal load on the device.

If the thermal level is not greater than a higher threshold, process 1100 determines if the thermal level is less than a lower threshold at block 1106. If the thermal level is less than a lower threshold, at block 1110, process 1100 adjusts the CPU processing frequency ceiling to decrease the CPU throttling. In one embodiment, process 1100 relaxes the restrictions placed on the CPU throughput for one or more of the different QoS. For example and in one embodiment, process 1100 can relax a QoS with a 75% CPU processing frequency ceiling back to an unrestricted 100% CPU processing frequency ceiling as described in FIG. 12 below. Alternatively, process 1100 can relax a restricted QoS at a 25% CPU processing frequency ceiling to a less restricted 50% selective forced idle. If the thermal level is not less than the lower threshold, process 1100 maintains the current CPU throttling at block 1112. Execution proceeds to block 1112 above.

Figure 12:
FIG. 12 is an illustration of a table of frequency ceiling percentages for different levels of CPU throttling.

FIG. 12 is an illustration of a table of frequency ceiling percentages for different levels of CPU throttling. In FIG. 12, table 1200 includes a column 1202 of QoS classes, column 1204 that includes the task class, and columns 1204A-C of different selective forced idle percentages for different CPU throttling conditions. In one embodiment, QoS 0 is the highest QoS and party N is the lowest QoS. In this embodiment, each of these QoSes can correspond to different classes of tasks. For example and in one embodiment, QoS 0 can be the class of tasks related to foreground applications. QoS 1 can be tasks related to applications in the app nap state. QoS N can be tasks related to background applications.

Three different CPU throttling conditions are illustrated in FIG. 12. In one embodiment, for the no CPU throttling condition 1204A, there is no reduction in the percent CPU percent frequency ceiling. In this embodiment, this means that each of the tasks is executed normally during the execution window. This condition represents a device with little or no thermal load. In this embodiment, each of the tasks will be scheduled for CPU execution and processed normally with no CPU throttling on the CPU processing core frequency. As the thermal load for the device increases, the device starts to throttle the lower QoS tasks. In one embodiment, this is illustrated the column 1204B where there is some CPU throttling for the lower QoS tasks. For example in one embodiment, QoS 0 and 1 execute normally with no reduction of the CPU processing core frequency. QoS 2 and N will have the CPU processing core frequency ceiling reduced to 90% and 75%, respectively. This illustrates the lower QoS processes getting potentially throttled by 10-25%. As the thermal load further increases, each of the QoSes will have the CPU throttled further. For example in one embodiment, in column 1204C, QoS 0 has a CPU processing core frequency ceiling of 90%, and QoSes 1, 2, and N have a CPU processing core frequency ceiling of 75, 50, and 25%, respectively. At this level, the lower QoSes are more selectively restricted, although still will get some CPU execution time. In another embodiment, the higher QoS tasks (e.g., QoS 0) can be selectively idled as well.

Figure 13:
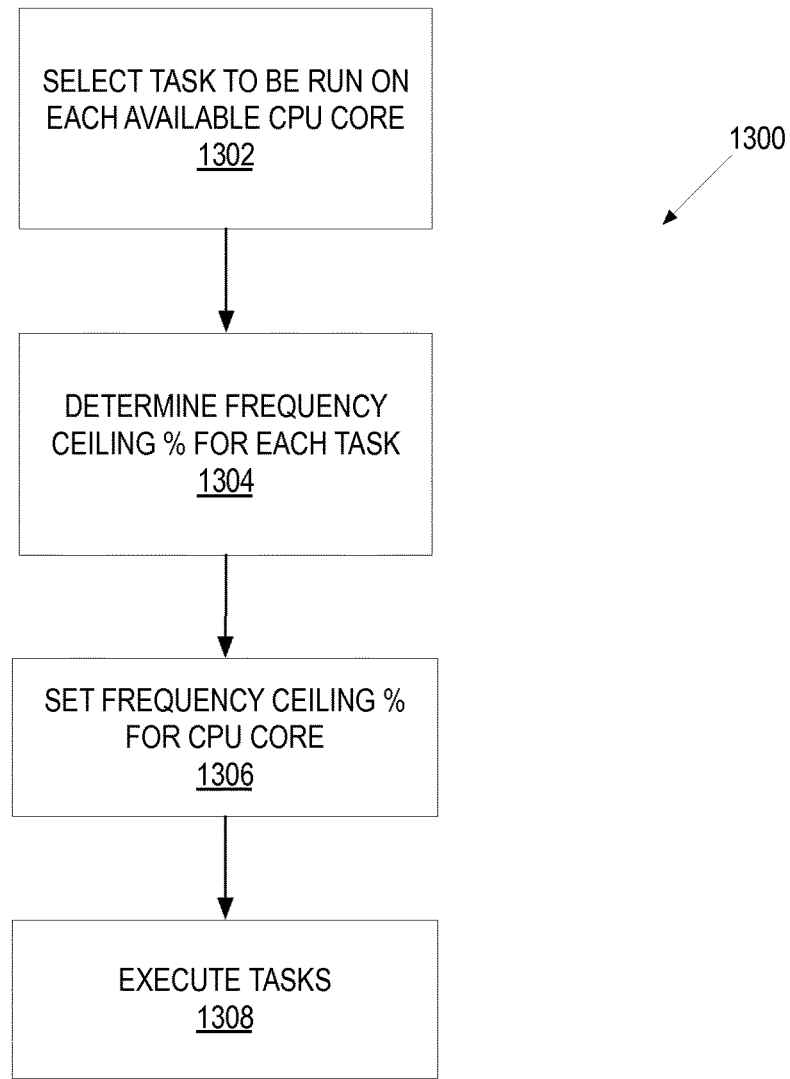
FIG. 13 is a flow diagram of one embodiment of a process to set a CPU frequency ceiling for a task on a CPU core.

FIG. 13 is a flow diagram of one embodiment of a process to set a CPU frequency ceiling for a task on a CPU core. In one embodiment, a CPU scheduler performs process 900 to set a CPU frequency ceiling for a task on a CPU core, such as CPU scheduler 116 as described above in FIG. 1. In FIG. 13, process 1300 begins by selecting a task to be run on each available CPU core. In one embodiment, process 1300 selects the tasks by looking at available tasks queued up and selecting the tasks with highest QoS. At block 1304, process 1300 determines the CPU frequency ceiling for each task. In one embodiment, process 1300 determines the CPU frequency ceiling based on a task's QoS and the current device thermal load. In one embodiment, the CPU frequency ceiling can be a percentage that is equal to or less than 100%. In one embodiment, process 1300 determines the task's CPU frequency ceiling using a table lookup based on task QoS. Process 1300 sets the CPU frequency ceiling for the CPU processing core at block 1306. In one embodiment, each of the CPU processing core have the same frequency. In this embodiment, process 1300 sets each processing core of the CPU to have the highest frequency of one of the tasks to be executed on one of the CPU processing cores of that CPU. Alternatively, the CPU frequency ceiling can be the lowest of one of the tasks to be executed on one of the CPU processing cores of that CPU. At block 1308, process 1300 executes the tasks using the CPU processing cores.

Figure 14:
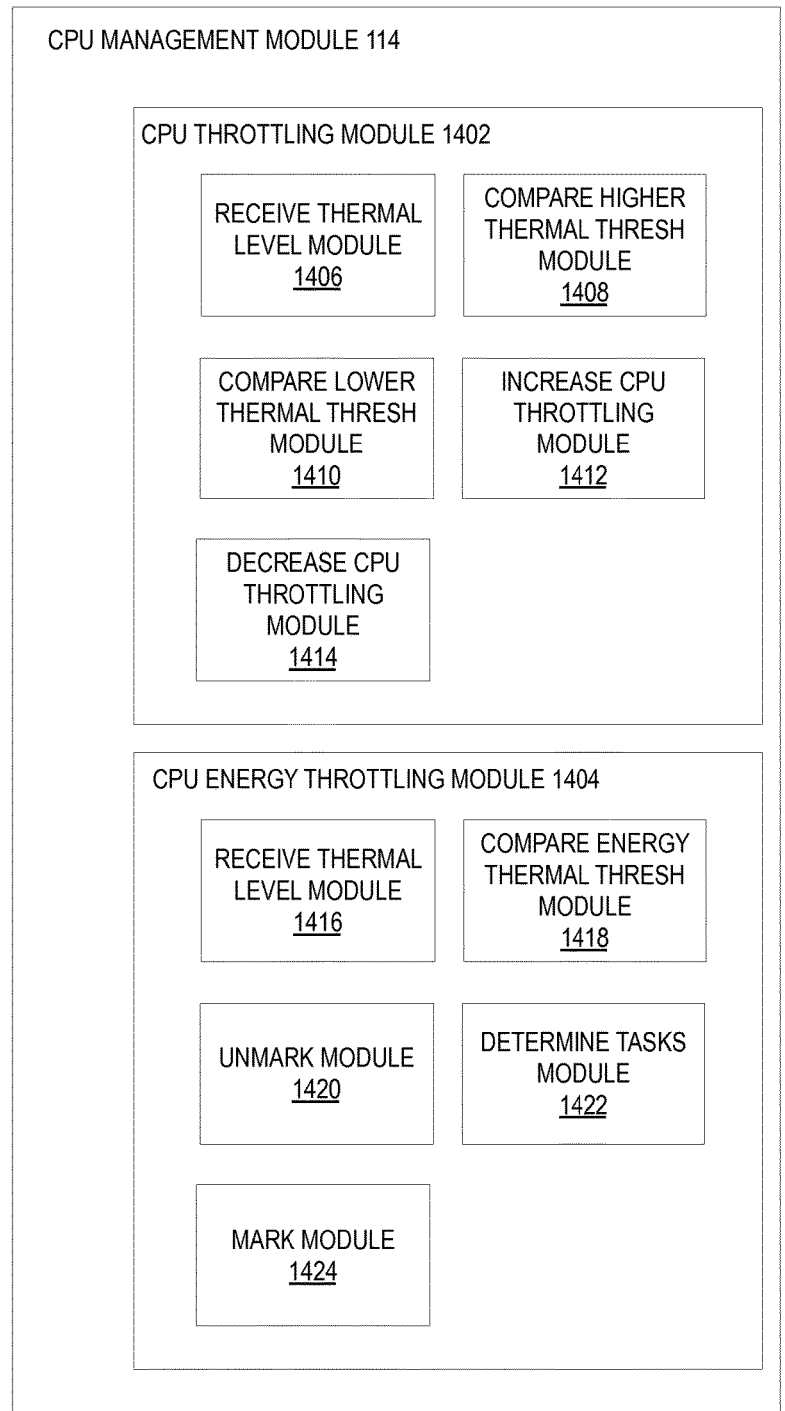
FIG. 14 is a block diagram of one embodiment of a CPU management module to manage CPU throttling based on the thermal level of the device.

FIG. 14 is a block diagram of one embodiment of a CPU management module 114 to manage CPU throttling based on the thermal level of the device. In one embodiment, the CPU management module 114 includes a CPU throttling module 1402 and a CPU high energy throttling module 1404. In one embodiment, the CPU throttling module 1402 manages CPU throttling based on the thermal level of the device as described in FIG. 7 above. In one embodiment, the CPU throttling module 1402 includes a receive thermal level module 1406, compare higher thermal threshold module 1408, compare lower thermal threshold module 1410, increase CPU throttling module 1412, and decrease CPU throttling module 1414. In one embodiment, the receive thermal level module 1406 receives the thermal level as described in FIG. 7, block 702 above. The compare higher thermal threshold module 1408 compares the thermal level with a higher thermal threshold as described in FIG. 7, block 704 above. The compare lower thermal threshold module 1410 compares the thermal level with a lower thermal threshold as described in FIG. 7, block 706 above. The increase CPU throttling module 1412 increases the CPU throttling for one or more tasks as described in FIG. 7, block 708 above. The decrease CPU throttling module 1414 decreases the CPU throttling for one or more processes as described in FIG. 7, block 710 above.

In one embodiment, the CPU high energy throttling module 1404 manages CPU throttling for a high energy consuming task based on the thermal level of the device as described in FIG. 8 above. In one embodiment, the CPU high energy throttling module 1404 includes a receive thermal level module 1416, compare energy thermal threshold module 1418, unmark tasks module 1420, determine tasks module 1422, and mark task module 1424. In one embodiment, the receive thermal level module 1416 receives the thermal level as described in FIG. 8, block 802 above. The compare energy thermal threshold module 1418 compares the thermal level with an energy threshold as described in FIG. 8, block 804 above. The unmark tasks module 1420 unmarks tasks for selective forced idling as described in FIG. 8, block 808 above. The determine tasks module 1422 determines if there are tasks running with a history of high energy consumption as described in FIG. 8, block 806 above. The mark task module 1424 marks tasks as candidates for CPU throttling using selective forced idling as described in FIG. 8, block 810 above.

Figure 15:
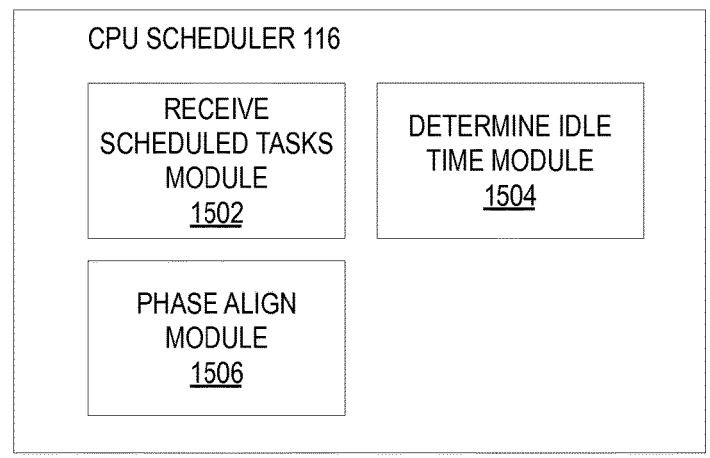
FIG. 15 is a block diagram of one embodiment of a CPU scheduler to schedule and execute tasks using CPU throttling.

FIG. 15 is a block diagram of one embodiment of a CPU scheduler 116 to schedule and execute tasks using CPU throttling. In one embodiment, the CPU scheduler 116 includes a receive scheduled tasks module 1502, determine idle time module 1504, and phase align module 1506. In one embodiment, the receive scheduled tasks module 1502 receives the scheduled tasks as described in FIG. 10, block 1002 above. The determine idle time module 1504 determines the forced idle times as described in FIG. 10, block 1004 above. The phase align module 1506 aligns the forced idle times as described in FIG. 10, block 1006 above.

Figure 16:
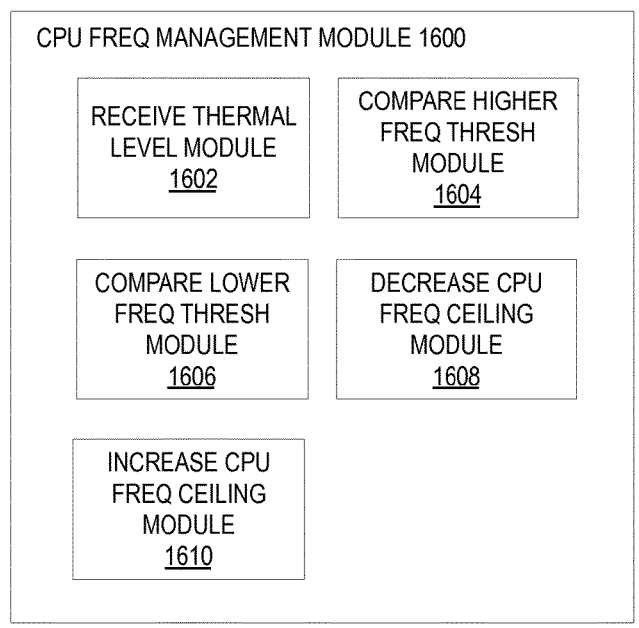
FIG. 16 is a block diagram of one embodiment of a frequency ceiling management module to manage CPU frequency ceilings based on the thermal level of the device.

FIG. 16 is a block diagram of one embodiment of a CPU frequency management module 1600 to manage CPU frequency ceilings based on the thermal level of the device. In one embodiment, the CPU frequency management module 1600 includes a receive thermal level module 1602, compare higher frequency threshold module 1604, compare lower frequency threshold module 1606, decrease CPU frequency ceiling module 1608, and increase CPU frequency ceiling module 1610. In one embodiment, the receive thermal level module 1602 receives the thermal level as described in FIG. 11, block 1102 above. The compare higher frequency threshold module 1604 compares the thermal level with a higher CPU frequency threshold as described in FIG. 11, block 1104 above. The compare lower frequency threshold module 1606 compares the thermal level with a lower CPU frequency threshold as described in FIG. 11, block 1106 above. The decrease CPU frequency ceiling module 1608 decreases the CPU frequency ceiling for one or more tasks as described in FIG. 11, block 1108 above. The increase CPU frequency ceiling module 1610 increases the CPU frequency ceiling for one or more processes as described in FIG. 11, block 1110 above.

Figure 17:
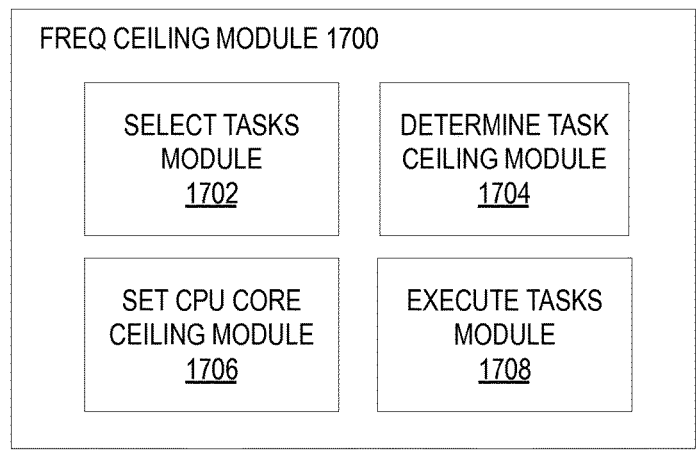
FIG. 17 is a block diagram of one embodiment of a frequency ceiling module to set a CPU frequency ceiling for a task on a CPU core.

FIG. 17 is a block diagram of one embodiment of a frequency ceiling module 1700 to set a CPU frequency ceiling for a task on a CPU core. In one embodiment, the frequency ceiling module 1700 includes a select tasks module 1702, determine task ceiling module 1704, set CPU core ceiling module 1706, and execute tasks module 1708. In one embodiment, the select tasks module 1702 selects a task to be run on each available CPU core as described in FIG. 13, block 1302 above. The determine task ceiling module 1704 determines the frequency ceiling percentage for each task as described in FIG. 13, block 1304 above. The set CPU core ceiling module 1706 sets the frequency ceiling percentage as described in FIG. 13, block 1306 above. The execute tasks module 1708 executes the tasks as described in FIG. 13, block 1308 above.

Figure 18:
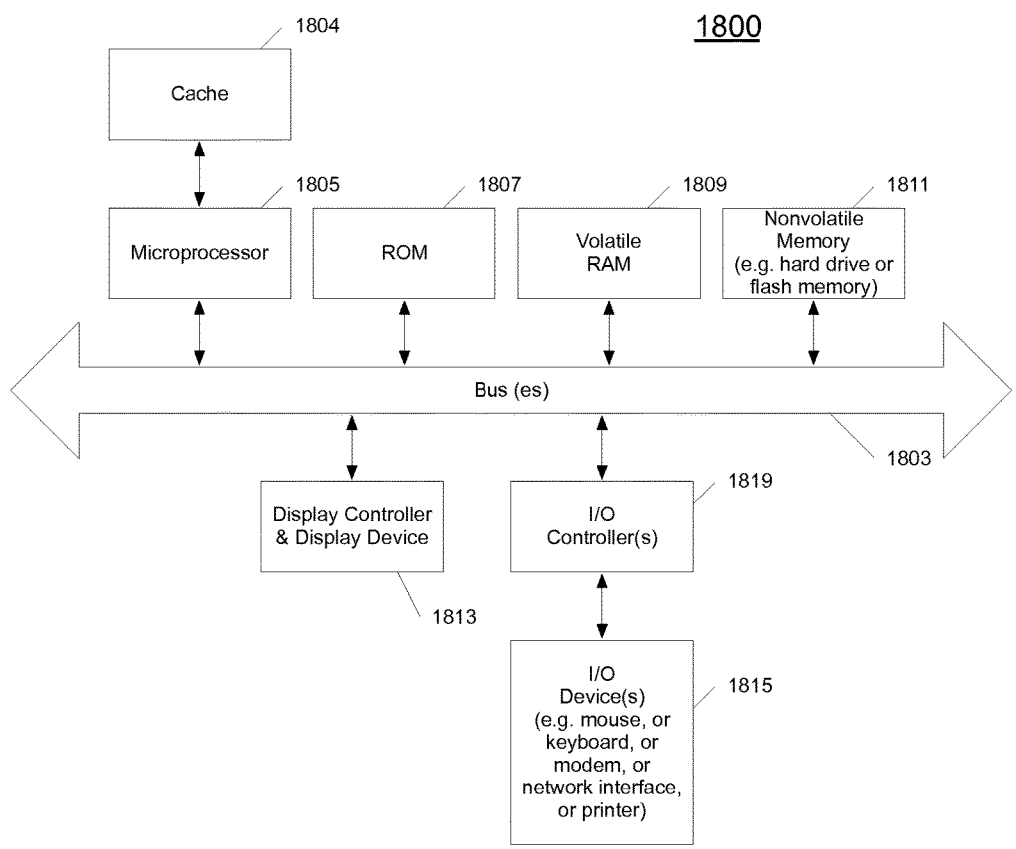
FIG. 18 illustrates one example of a typical computer system, which may be used in conjunction with the embodiments described herein.

FIG. 18 shows one example of a data processing system 1800, which may be used with one embodiment of the present invention. For example, the system 1800 may be implemented including a device 100 as shown in FIG. 1. Note that while FIG. 18 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 18, the computer system 1800, which is a form of a data processing system, includes a bus 1803 which is coupled to a microprocessor(s) 1805 and a ROM (Read Only Memory) 1807 and volatile RAM 1809 and a non-volatile memory 1811. The microprocessor 1805 may retrieve the instructions from the memories 1807, 1809, 1811 and execute the instructions to perform operations described above. The bus 1803 interconnects these various components together and also interconnects these components 1805, 1807, 1809, and 1811 to a display controller and display device 1818 and to peripheral devices such as input/output (I/O) devices which may be mice, keyboards, modems, network interfaces, printers and other devices which are well known in the art. Typically, the input/output devices 1815 are coupled to the system through input/output controllers 1813. The volatile RAM (Random Access Memory) 1809 is typically implemented as dynamic RAM (DRAM), which requires power continually in order to refresh or maintain the data in the memory.

The mass storage 1811 is typically a magnetic hard drive or a magnetic optical drive or an optical drive or a DVD ROM or a flash memory or other types of memory systems, which maintain data (e.g. large amounts of data) even after power is removed from the system. Typically, the mass storage 1811 will also be a random access memory although this is not required. While FIG. 18 shows that the mass storage 1811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1803 may include one or more buses connected to each other through various bridges, controllers and/or adapters as is well known in the art.

Figure 19:
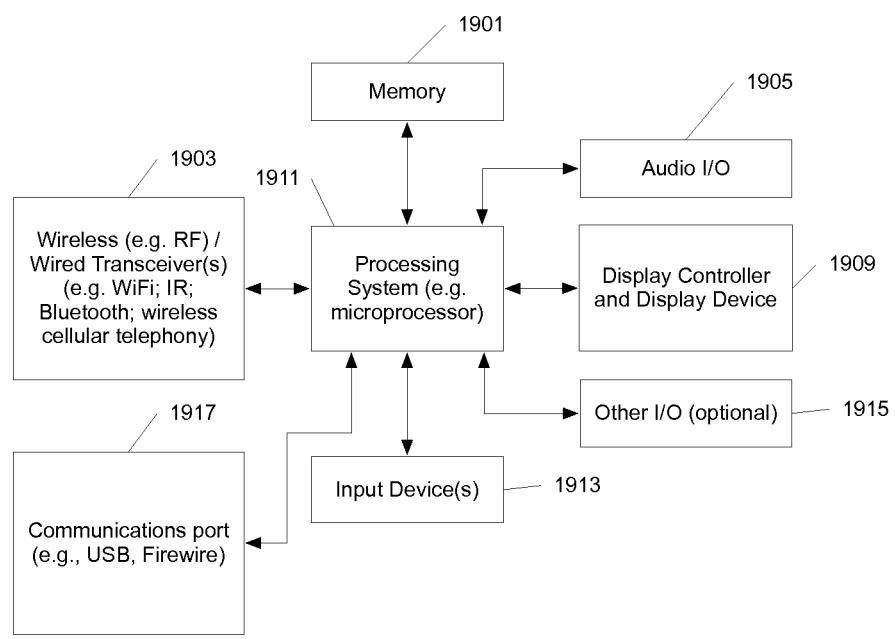
FIG. 19 shows an example of a data processing system, which may be used with one embodiment of the present invention.

FIG. 19 shows an example of another data processing system 1900 which may be used with one embodiment of the present invention. For example, system 1900 may be implemented as a device 100 as shown in FIG. 1. The data processing system 1900 shown in FIG. 19 includes a processing system 1911, which may be one or more microprocessors, or which may be a system on a chip integrated circuit, and the system also includes memory 1901 for storing data and programs for execution by the processing system. The system 1900 also includes an audio input/output subsystem 1905, which may include a microphone and a speaker for, for example, playing back music or providing telephone functionality through the speaker and microphone.

A display controller and display device 1909 provide a visual user interface for the user; this digital interface may include a graphical user interface which is similar to that shown on a Macintosh computer when running OS X operating system software, or Apple iPhone when running the iOS operating system, etc. The system 1900 also includes one or more wireless transceivers 1903 to communicate with another data processing system, such as the system 1900 of FIG. 19. A wireless transceiver may be a WLAN transceiver, an infrared transceiver, a Bluetooth transceiver, and/or a wireless cellular telephony transceiver. It will be appreciated that additional components, not shown, may also be part of the system 1900 in certain embodiments, and in certain embodiments fewer components than shown in FIG. 19 may also be used in a data processing system. The system 1900 further includes one or more communications ports 1917 to communicate with another data processing system, such as the system 800 of FIG. 8. The communications port may be a USB port, Firewire port, Bluetooth interface, etc.

The data processing system 1900 also includes one or more input devices 1913, which are provided to allow a user to provide input to the system. These input devices may be a keypad or a keyboard or a touch panel or a multi touch panel. The data processing system 1900 also includes an optional input/output device 1915 which may be a connector for a dock. It will be appreciated that one or more buses, not shown, may be used to interconnect the various components as is well known in the art. The data processing system shown in FIG. 19 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1900 may be a network computer or an embedded processing device within another device, or other types of data processing systems, which have fewer components or perhaps more components than that shown in FIG. 19.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "monitoring," "decreasing," "increasing," "maintaining," "executing," "processing," "scheduling," "throttling," "restoring," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to manage a thermal profile of a device, the method comprising:
monitoring thermal level of the thermal profile of the device, wherein the device is executing a plurality of tasks that utilize a central processing unit (CPU) of the device and the plurality of tasks including a high quality of service (QoS) task and a low QoS task, wherein the high QoS task and the low QoS task have a different QoS level and a QoS for a task is derived from at least one characteristic of that task;
in response to the thermal level of the device exceeding a first thermal threshold, increasing a first CPU throttling for the low QoS task, and maintaining a second CPU throttling for the high QoS task;
executing the low QoS task using the first CPU throttling with a first processing core of the CPU by selectively forcing an idle of the low QoS task during an execution window; and
executing the high QoS task using the second CPU throttling with a second processing core of the CPU, wherein the first and second CPU throttling are each a different selective forced idle percentage that results in a corresponding CPU utilization less than the maximum operating frequency of the CPU.

2. The non-transitory machine-readable medium of claim 1, wherein a CPU throttling sets an amount of selective forced idling used for a task when that task is executed by the CPU.

3. The non-transitory machine-readable medium of claim 2, wherein a selective forced idle is an amount of time during the execution window that a task is not being executed.

4. The non-transitory machine-readable medium of claim 2, further comprising:
putting the first processing core in a low power state during the select forced idle.

5. The non-transitory machine-readable medium of claim 1, in response to the thermal level of the device exceeding a second thermal threshold, further increasing the first CPU throttling; and
increasing the second CPU throttling, wherein the second CPU throttling is less than the first CPU throttling.

6. The non-transitory machine-readable medium of claim 5, in response to the thermal level falling below the second thermal threshold, restoring the first and second CPU throttling to previous values.

7. The non-transitory machine-readable medium of claim 1, wherein the thermal level is selected from the group consisting of device temperature and audible fan noise.

8. The non-transitory machine-readable medium of claim 1, wherein the high QoS task is foreground task and the low QoS is a batch task.

9. The non-transitory machine-readable medium of claim 1, wherein the monitoring of the thermal level comprises:
recording a device temperature.

10. A non-transitory machine-readable medium having executable instructions to cause one or more processing units to perform a method to manage a thermal profile of a device, the method comprising:
monitoring thermal level of the thermal profile of the device, wherein the device is executing a plurality of tasks that utilize a plurality of processing cores of the device and the plurality of tasks including multiple low QoS tasks;
scheduling the plurality of tasks on the plurality of processing cores for an execution window, wherein each of the multiple low QoS tasks are selectively forced idled at zero percentage during the execution window and the forced idled times of the multiple low QoS tasks overlap and the execution window is a time period in which the plurality of tasks are scheduled for execution on the plurality of processing cores; and
executing the plurality of tasks.

11. The non-transitory machine-readable medium of claim 10, wherein a selective forced idle for one of the plurality of tasks is an amount of time during the execution window when that task is not being executed.

12. The non-transitory machine-readable medium of claim 10, wherein the scheduling further comprises:
overlapping the selective force idles for one of the multiple low QoS tasks with another one of the multiple low QoS tasks.

13. The non-transitory machine-readable medium of claim 12, wherein each of the multiple low QoS tasks are selectively forced idle at a same point in the execution window.

14. A method to manage a thermal profile of a device, the method comprising:
monitoring thermal level of the thermal profile of the device, wherein the device is executing a plurality of tasks that utilize a central processing unit (CPU) of the device and the plurality of tasks including a high quality of service (QoS) task and a low QoS task, wherein the high QoS task and the low QoS task have a different QoS level and a QoS for a task is derived from at least one characteristic of that task;
in response to the thermal level of the device exceeding a first thermal threshold, increasing a first CPU throttling for the low QoS task, and maintaining a second CPU throttling for the high QoS task;
executing the low QoS task using the first CPU throttling with a first processing core of the CPU by selectively forcing an idle of the low QoS task during an execution window; and
executing the high QoS task using the second CPU throttling with a second processing core of the CPU, wherein the first and second CPU throttling are each a different selective forced idle percentage that results in a corresponding CPU utilization less than the maximum operating frequency of the CPU.

15. The method of claim 14, wherein a CPU throttling sets an amount of selective forced idling used for a task when that task is executed by the CPU.

16. The method of claim 15, wherein a selective forced idle is an amount of time during the execution window that a task is not being executed.

17. The method of claim 15, further comprising:
putting the first processing core in a low power state during the select forced idle.

18. A method to manage a thermal profile of a device, the method comprising:
monitoring thermal level of the thermal profile of the device, wherein the device is executing a plurality of tasks that utilize a plurality of processing cores of the device and the plurality of tasks including multiple low QoS tasks;
scheduling the plurality of tasks on the plurality of processing cores for an execution window, wherein each of the multiple low QoS tasks are selectively forced idled at zero percentage during the execution window and the forced idled times of the multiple low QoS tasks overlap and the execution window is a time period in which the plurality of tasks are scheduled for execution on the plurality of processing cores; and
executing the plurality of tasks.

* * * * *